United States Patent Office 3,157,688
Patented Nov. 17, 1964

3,157,688
CATALYTIC PROCESS FOR THE PREPARATION OF NITRILES
Charles Arnold, Jr., Woodbury, Jurgen M. Kruse, Pitman, and Edward L. Reilly, Woodbury, N.J., assignors to E. I. du Pont de Nemours and Company, Wilmington, Del., a corporation of Delaware
No Drawing. Filed Mar. 16, 1960, Ser. No. 15,275
9 Claims. (Cl. 260—465.3)

The present invention relates to a process for preparing nitriles.

The synthesis of nitriles by the vapor-pase reaction of nitric oxide and alkyl-substituted organic compounds containing at least one alkyl group directly attached to a carbon atom which, in turn, is joined to another carbon atom by a double bond is described in U.S. Patent 2,736,739. In the disclosed process, the reaction of the nitric oxide with the organic compounds is carried out at a temperature of 400 to 700° C. in the presence of a dehydrogenation catalyst, the preferred catalyst being silver, especially silver extended on charcoal, silica, or alumina.

The synthesis of acrylonitrile by the reaction of propylene and nitric oxide over silver-on-silica catalyst is exemplified in the aforementioned patent. The reaction is effected at a furnace temperature of 430 to 475° C., the "hot-spot" temperature in the catalyst bed rising to 500° C., to give acrylonitrile in conversions up to about 12%. Other nitriles are obtained from other compounds having the alkyl-C=C linkage by analogous procedures in conversions up to about 27%. While such single-pass conversions are entirely adequate for many purposes and can be obviated in part by recycle procedures, an increase in the nitrile conversions and yields obtained in the subject synthesis naturally would be desirable, particularly in commercial operations.

Accordingly, an object of the present invention is to provide an improved process for synthesizing nitriles by the catalyzed vapor-phase reaction of nitric oxide with organic compounds containing at least one alkyl group directly attached to a carbon atom which in turn is linked to another carbon atom by a double bond. Another object is to provide a process for obtaining nitriles in improved yields and conversions from nitric oxide and the subject class of organic compounds. An additional object is to provide a process for the synthesis of nitriles from nitric oxide and compounds containing the alkyl-C=C linkage which is economical to operate. Other objects of this invention will become apparent from the ensuing specification and claims.

Realization of the foregoing and related objects is achieved when the vapor-phase reaction of nitric oxide with an organic compound containing at least one alkyl group directly attached to a carbon atom which, in turn, is attached to another carbon atom by a double bond is effected in the presence of a catalyst containing thallium ion. The thallium ion may be present as an inorganic compound of thallium, e.g., thallium oxide or thallium silicate, and thus constitute up to 90 percent or more of the total catalyst composition. Alternatively and preferably, the thallium ion is present on an inorganic oxide supporting medium on which there may also be present one or more additional ions of metals and certain nonmetallic elements, as will be described and exemplified more fully hereinafter.

The following Tables II to IV are intended to illustrate specific embodiments of the process of the invention which, however, is not to be construed as limited thereto. The oxidation states of the metals and nonmetallic elements indicated under the catalyst heading are those in which these materials were introduced, and the balance of the catalyst compositions shown are made up of the specified supports.

In the runs of the tables, two reaction procedures were used. In the procedure labelled "A," a feed stream composed (by volume) of 24.8% of propylene, 7.8% of nitric oxide, and 68.2% of argon was passed at atmospheric pressure through a catalyst bed at a space velocity of 1200 reciprocal hours, the catalyst volume being such that the contact time was 1.2 seconds. Procedure "B" was analogous except that a feed stream of 27.0 volume percent propylene, 9.0% nitric oxide, and 64.0% nitrogen was fed at two atmospheres' pressure through a catalyst bed, the feed rate and the bed volume being such that the space velocity was 2240 reciprocal hours and the contact time was 1.1 seconds. In both procedures, the catalyst bed was heated by an electric heater and the amount of acrylonitrile in the product stream was determined by vapor chromatography.

The supported catalyst containing thallium ion were generally prepared by one of two similar procedures, neither of which resulted in the loss of active ionic values. In the first, an aqueous solution of a decomposable compound of thallium (thallous nitrate unless otherwise specified) and optionally of one or more other ionic compounds (also the nitrates unless otherwise specified) was made up to contain a volume of water equivalent to the pore volume of the support to be used, and after the solution was heated almost to the boiling point, it was shaken with the support which had been preheated at 200° C. in an oven for two hours. After absorption of the solution, the impregnated mass was heated in air in an oven to 200° C. for an additional two hours. In the second procedure, the support was added to an aqueous solution of the decomposable components (again the nitrates, unless otherwise specified) containing a volume of water twice the volume of the support. The completed catalyst then was evaporated to dryness prior to the two-hour conditioning in air at 200° C. (Minor variations in these modes of supported catalyst preparation are indicated in the individual runs of the tables.) The catalyst supports used were those described in Table I.

TABLE I

| Support Number | I | II | III | IV | V | VI | VII |
|---|---|---|---|---|---|---|---|
| Chemical Composition (percent): | | | | | | | |
| $SiO_2$ | 21.2 | Balance | 99.5 | 99.7 | | | 99.7. |
| $Al_2O_3$ | 77.0 [a] | 150–750 p.p.m. | | | 100 | 100 | 0.1. |
| $Fe_2O_3$ | 0.2 | 0.08–0.5 | 0.019 | 0.03 | | | 0.1. |
| $Na_2O$ | 0.5 | 0.08–0.5 | 0.092 | 0.02 | | | 0.1. |
| $K_2O$ | 0.2 | | | | | | |
| MgO | | | | | | | |
| $Cr_2O_3$ | | | | | | | |
| $ThO_2$ | | | | | | | |
| PbO | | | | | | | |
| $TiO_2$ | | | | | | | |
| ZnO | | | | | | | |
| CdO | | | | | | | |
| Physical Properties: | | | | | | | |
| Bulk density (g./cc.) | 0.7±0.05 | 0.46 | 0.44 | 0.7 | 0.736 | 1.18 | 0.818. |
| Surface area (sq. m./g.) | 6–8 | 350 | 340 | 832 | 38 | 1.4 | <1. |
| Pore diameter (Å.) | 3,200 | 95 | 140 | 22 | 660 | 114 | |
| Mesh size or diameter (in.) | 3/16 in | 4–10 | 6–14 | 6–14 | 1/8 in | 3–4 | 1/8 in. |
| Length (in.) | | | | | 1/4 | | 1/8. |
| Shape | IP [b] | S [c] | I [d] | I [d] | E [e] | W [f] | P [g]. |

| Support Number | VIII | IX | X | XI | XII | XIII | XIV |
|---|---|---|---|---|---|---|---|
| Chemical Composition (percent): | | | | | | | |
| $SiO_2$ | 2.69 | 0.01 | | | | | |
| $Al_2O_3$ | 0.13 | 70.50 | | | | 0.02 | 0.01. |
| $Fe_2O_3$ | 0.05 | 0.08 | | 100 | 96.0 | | |
| $Na_2O$ | 0.01 | 0.05 | | | | } 0.05 [h] | 0.06 [h] |
| $K_2O$ | 0.01 | 0.05 | | | | | |
| MgO | 96.94 | 29.30 | | | | | |
| $Cr_2O_3$ | | | | | 4.0 | | |
| $ThO_2$ | | | 100 | | | | |
| PbO | | | | | | 0.03 | 0.10. |
| $TiO_2$ | | | | | | Balance | 99.0. |
| ZnO | | | | | | | 0.05. |
| CdO | | | | | | | |
| Physical Properties: | | | | | | | |
| Bulk density (g./cc.) | 1.2 | 0.89–0.96 | 3.2 | 1.4 | 1.3 | 0.99 | 0.8. |
| Surface area (sq. m./g.) | <1 | 3 | <1 | 13.7 | 10–12 | 6.8 | |
| Pore diameter (Å.) | | 1,600 | | 82 | 114 | 2,500 | |
| Mesh size or diameter (in.) | 1/8 in | 3/16 in | 3/16 in | 1/8 in | 1/8 in | 3/16 in | 3/16 in. |
| Length (in.) | 1/8 | 3/16 | 3/16 | 1/4 | 1/4 | 3/16 | 3/16. |
| Shape | P [g] | P [g] | P [g] | E [e] | E [e] | P [g] | P [g]. |

[a] Predominately alpha alumina. [b] Irregularly shaped pellets. [c] Spheres. [d] Irregular aggregates. [e] Extrusions. [f] Worm-shaped aggregates. [g] Pellets. [h] As soluble salts.

The peak conversion temperature in the following tables refers to the temperature at which the maximum conversion of nitric oxide to acrylonitrile (reported in the adjacent column) was realized under single-pass conditions with each catalyst composition. By conversion is meant the relationship, expressed in percent, between the moles of acrylonitrile obtained and the moles theoretically obtainable from the moles of nitric oxide fed to the reaction zone. Where determined, the yields of acrylonitrile based on nitric oxide also are included in the tables. Yield expresses the relationship between the moles of acrylonitrile obtained and the moles theoretically obtainable based on the nitric oxide consumed in the reaction (i.e., the moles fed to the reactor less the moles of unreacted NO recovered). Both the conversion and the yield calculations were based on the following reaction stoichiometry:

$$H_2C=CH-CH_3 + 1.5NO \rightarrow H_2C=CH-C\equiv N + 0.25N_2 + 1.5H_2O$$

TABLE II

*Supported Catalysts Containing Thallium Ion*

| Run | Catalyst Wt. Percent Tl+ | Catalyst Support No. | Reaction Procedure | Peak Conversion Temp., °C | Max. Conversion (percent) | Yield (percent) |
|---|---|---|---|---|---|---|
| II-A | 4.0 | I | A | 562 | 54 | 71 |
| II-B | 20.0 | I | A | 538 | 57 | 61 |
| II-C | 18.0 | II | A | 537 | 76 | 78 |
| II-D | 4.0 | II | A | 516 | 34 | 50 |
| II-E | 7.4 | III | A | 600 | 69 | |
| II-F | 57.0 | II | A | 570 | 67 | |
| II-G | 2.7 | X | A | 505 | 34 | |
| II-H | 10.0 | XIII | B | 520 | 52 | 53 |
| II-J | 2.0 | XIV | A | 543 | 26 | |

TABLE III

*Supported Catalysts Containing Thallium Ion and Iron Ion (With and Without Additional Ionic Components)*

| Run | Catalyst, wt. percent of | | | Catalyst Support No. | Reaction Procedure | Peak Conversion Temp., °C | Max Conversion | Yield (percent) |
|---|---|---|---|---|---|---|---|---|
| | $Tl^+$ | $Fe^{+3}$ | Other Ions | | | | | |
| III-A | 5.8 | 11.1 | | I | A | 450 | 69 | 75 |
| III-B | 6.5 | 1.6 | | I | A | 495 | 76 | 80 |
| III-C | 15.0 | 1.5 | | I | A | 500 | 78 | 80 |
| III-D | 8.7 | 1.3 | | VI | A | 471 | 83 | |
| III-E | 5.8 | 2.6 | | VII | A | 407 | 54 | |
| III-F | 11.0 | 2.0 | | VIII | A | 433 | 45 | |
| III-G | 11.0 | 2.0 | | IX | A | 433 | 64 | |
| III-H | 8.7 | 1.3 | | V | A | 365 | 56 | |
| III-J | 9.0 | 1.5 | | I [a] | A | 475 | 88 | |
| III-K | 10.0 | [b] 10.0 | | I | B | 488 | 66 | 66 |
| III-L | 10.0 | [b] 40.0 | | I | B | 491 | 44 | 50 |
| III-M | 0.75 | [c] 69.9 | | XI | B | 499 | 67 | 78 |
| III-N | 10.0 | [d] 60.4 | $Cr^{+3}$ 2.5 [d] | XII | A | 426 | 64 | 69 |
| III-O | 7.6 | 1.0 | $Cr^{+3}$ 0.75 [e], $Ag^+$ 0.9 | I | B | 460 | 68 | |
| III-P | 10.0 | [b] 11.0 | $Ag^+$ 0.5 | I | B | 466 | 57 | |
| III-Q | 8.6 | 3.7 | $Pd^{+2}$ 0.1 | I | B | 474 | 66 | |
| III-R | 6.3 | 3.0 | $Pt^{+4}$ 0.1 [f] | I | A | 480 | 78 | |
| III-S | 12.2 | 0.9 | $Co^{+2}$ 1.1 | I | B | 482 | 65 | |
| III-T | 6.8 | 3.7 | $Ni^{+2}$ 0.1 | I | B | 460 | 65 | |
| III-U | 8.5 | 1.5 | $Ni^{+2}$ 0.4 [g] | I | B | 478 | 65 | |
| III-V | 9.7 | 1.5 | $Mn^{+2}$ 0.4 | I | A | 475 | 68 | |
| III-W | 9.6 | 1.5 | $Sn^{+2}$ 1.1 [h] | I | A | 475 | 78 | |
| III-X | 6.3 | 3.0 | $Ca^{+2}$ 0.1 | I | A | 500 | 64 | |

[a] 4 Wt. Percent of Support No. I replaced with boehmite, AlCOH.
[b] $Fe^{+3}$ calcined into support at >700° C. prior to $Tl^+$ addition.
[c] Present as $Fe_2O_3$ support.
[d] Present as 96/4 $Fe_2O_3/Cr_2O_3$ support.
[e] Added with $Tl^+$ as $Tl_2CrO_4$.
[f] Pt added as $K_2PtCl_6$.
[g] $Ni^{+2}$ calcined into support at >1,100° C. prior to $Tl^+$ addition.
[h] $Sn^{+2}$ added as $SnSO_4$.

TABLE IV

*Supported Catalysts Containing Thallium Iron and at Least One Additional Non-Iron Ionic Component*

| Run | Catalyst, wt. percent of | | Catalyst Support No. | Procedure | Peak Conversion Temp., °C | Max. Conversion (percent) | Yield (percent) |
|---|---|---|---|---|---|---|---|
| | $Tl^+$ | Other ions | | | | | |
| IV-A | 5.9 | $Pb^{+2}$ 1.9 | III | A | 559 | 49 | 55 |
| IV-B | 15.9 | $Pb^{+2}$ 0.3 | III | A | 559 | 79 | 88 |
| IV-C | 15.8 | $Pb^{+2}$ 0.6, $B^{+3}$ 0.6 | III | A | 566 | 58 | 65 |
| IV-D | 14.0 | $Co^{+2}$ 1.0 | I | B | 480 | 53 | |
| IV-E | 14.0 | $Co^{+2}$ 0.12 | III | A | 565 | 75 | |
| IV-F | 14.0 | $Mn^{+2}$ 4.0 | I | B | 470 | 53 | |
| IV-G | 7.0 | $Cr^{+3}$ 1.0 | I | B | 524 | 66 | |
| IV-H | 6.2 | $Cr^{+3}$ 0.54 [a] | I | A | 472 | 33 | |
| IV-J | 7.4 | $Ni^{+2}$ 0.13 | IV | A | 545 | 58 | |
| IV-K | 14.0 | $Ni^{+2}$ 2.0 | I | A | 490 | 68 | 80 |
| IV-L | 8.7 | $Ag^+$ 3.4 | I | B | 500 | 47 | |
| IV-M | 10.0 | $Pd^{+2}$ 0.3 | I | A | 499 | 61 | |
| IV-N | 10.0 | Pt 0.5 [b] | I | B | 500 | 48 | |
| IV-O | 7.0 | Pt 0.1 [b], $Pd^{+2}$ 0.1 | I | B | 498 | 44 | |
| IV-P | 14.0 | $Ca^{+2}$ 1.4 | II | A | 583 | 48 | |
| IV-Q | 14.5 | $Al^{+3}$ 1.4 | II | A | 554 | 56 | |
| IV-R | 11.3 | $Bi^{+3}$ 0.6 | III | A | 578 | 67 | |
| IV-S | 11.3 | $Sb^{+3}$ 1.8 | III | A | 573 | 54 | |
| IV-T | 6.5 | $In^{+3}$ 4.5 | I | B | 547 | 31 | |
| IV-U | 9.7 | $P^{+5}$ 0.6 [c] | I | A | 500 | 30 | |
| IV-V | 8.0 | $U^{+6}$ 0.3 | II | A | 570 | 45 | |
| IV-W | 20.0 | $Ba^{+2}$ 1.6 | III | A | 555 | 54 | |
| IV-X | 11.5 | $Cd^{+2}$ 0.6 | III | A | 558 | 33 | |
| IV-Y | 14.0 | $B^{+3}$ 0.1 | II | A | 577 | 52 | |

[a] Added as hydrated $Cr(OAc)_3$ simultaneously with $Tl^+$.
[b] Added as $Pt(NH_3)_2(NO_2)_2$.
[c] Added as $H_3PO_4$.

In the present improved process for obtaining nitriles, particularly acrylonitrile from nitric oxide and propylene, in the presence of catalysts containing thallium ion, the thallium may be present, as is obvious from the foregoing tables, in a wide variety of permutations and combinations. Metallic thallium is not directly suitable; the thallium used as or introduced into the catalyst should be present at least in part as one or more compounds of the metal. Accordingly, by "thallium ion" in the present specification and claims, we intend to mean that the thallium used catalytically shall be present at least partly in associated or combined form, i.e., in an oxidation state of at least +1. Such compounds of thallium are the oxides (including hydrated oxides or hydroxides) and the salts of organic and inorganic acids. In the last-named category, there may be mentioned particularly thallium salts of inorganic mono- and polyacids containing oxygen, such as thallium nitrate, sulfate, silicate, phosphate, chromate, dichromate, molybdate, vanadate, and tungstate, and thallium salts of inorganic heteropoly oxygen acids, especially those containing transition metals of Groups V–VIII of the Periodic System, e.g., thallium phosphomolybdate or tungstomolybdate.

Thallous and thallic oxides and salts are both useable in the present process, and while we do not wish to be limited by any theoretical considerations, evidence exists that when thallous oxide or a thallous salt readily convertible thereto, e.g., the nitrate, is used in preparing a supported catalyst, the thallous ion present is partially oxidized to the thallic state, so that the final composition actually contains a mixture of the two forms.

From the foregoing discussion and the runs of the tables, it is obvious that it is possible to use as the catalyst or in its preparation thallium salts which provide one or more additional ions of metals and certain nonmetallic elements such as boron or phosphorous. These ions may, of course, also be introduced as oxides or salts independent of the thallium compounds or they may also be present as part of the catalyst support. The additional metal ions may be of Groups I$b$, II$a$ II$b$, III$a$ IV$a$, V$a$, V$B$, VI$b$, VII$b$, and VIII$b$ of the Periodic System of the Elements, thallium catalysts containing iron ion or lead ion, with or without additional ions of the mentioned types, being a preferred class of catalysts.

The amount of thallium ion present may range from as little as about 0.5 weight percent of the total catalyst composition in the case of supported catalysts to 90 weight percent or more of the total when unsupported thallium oxide(s) are used and up to 85% of the total when certain unsupported thallium salts, e.g., thallium silicate, are used. In the supported catalysts, we prefer that the amount of the thallium ion be between 1 and about 30 weight percent of the total catalyst composition, particularly from 1 to 20 percent of the total. The effective amounts of the other ions vary widely. By "effective" it is meant to include amounts of these ions which exert a favorable influence on such process factors as yields and conversions to the desired nitrile or nitriles (i.e., favorable utilization of reactants); the conditions, particularly the temperatures, under which the reaction is economically run; and in a continuous process, the effective life of the catalyst. The last-mentioned category includes the ability of the catalyst to resist fouling by carbon and other inactivators deposited or formed thereon during the reaction; the stability of the catalyst, i.e., its ability to undergo prolonged use without loss of activity, e.g., by loss of the active ionic values; and the ease with which the catalyst can be regenerated. For example, the addition of iron ion (and/or another iron group metal ion) to the thallium-containing catalysts not only tends to lower the temperatures at which high conversions of nitric oxide to acrylonitrile occur in the propylene-nitric oxide reaction but also tends to increase the conversions achievable. On the other hand, the noble metal ion additives, including silver, palladium, and platinum ions, tend to increase the life of the thallium-containing catalysts, whereas the addition of boron ion to thallium catalysts, particularly those containing lead ion, increases the selectivity of these catalysts for acrylonitrile formation. In more specific terms, we have found that in supported catalysts containing thallium ion in the preferred range of 1 to 20 weight percent of the total composition, the following amounts of other ions are particularly "effective" in one or more of the aforementioned senses.

TABLE V

| Ions | Wt. Percent of Catalyst |
|---|---|
| Fe Cr Co Ni | 0.5–35 [a] |
| Pt Pd | 0.001–2 [a] |
| Ag | 0.5–10 |
| Pb | 0.01–20 |
| B | 0.01–10 |

[a] I.e., singly or in combination.

The catalyst support or carrier used in the present process may be essentially inert or, per se or by virtue of additions of the aforementioned ions, may have a favorable effect on the process when used in conjunction with thallium ion. A suitable group of supports are characterized by high porosity, low surface area, and low cracking activity, and a preferred class includes those supports which initially possess or can be imparted with these properties and contain major amounts, i.e., 50 percent by weight or greater, of one or more inorganic oxides, including the refractory oxides. Such oxides include those of aluminum, silicon, magnesium, iron, zinc, thorium, uranium, titanium, and the like. $Fe_2O_3$ is a preferred iron oxide, either alone or in combination with other materials, and alumina which is predominately in the alpha form has been found particularly effective, also alone or in combination with other oxides such as mullite, boehmite, or magnesia. The supports may be conditioned prior to use by such conventional procedures as calcination, treatment with steam, and the like.

The supported catalysts may be prepared not only by the impregnation techniques described in the foregoing but also by other conventional procedures, e.g., precipitation on the support of the thallium-containing compound, with or without additional catalytically active ions. Preparation of the catalyst by co-precipitation of all or part of the thallium ion and particularly of the additional ionic values with the support also is within the scope of the invention. The final catalyst composition may be subjected to one or more calcination treatments following its preparation.

The reaction temperature, particularly the temperature at which maximum conversions to the desired nitrile or nitriles are achieved, will vary widely, depending not only on the catalyst composition chosen but also on the specific organic starting material used. Generally, the temperature employed will fall within the range of 250 to 700° C., particularly 300 to 600° C. As was mentioned above, certain ions, particularly of iron, are effective when used with thallium ion in lowering the maximum conversion temperature in the synthesis of acrylontrile. Such a lowering of the effective reaction temperature not only offers initial economies with respect to materials of construction but also is desirable in that corrosion and side reactions are minimized.

As Procedure "A" of the runs of the tables shows, the present reaction is operable at atmospheric pressure, but from the point of view of ease of feed stream processing, slight superpressures, e.g., up to about 5 atmospheres, are generally preferred. The feed stream should be so composed as to provide between 0.1 and 3.0 moles of nitric oxide per mole of propylene, the lower ratio favoring high conversions based on nitric oxide and the higher ratio simplifying the separation of the product from unreacted starting material.

In addition to propylene and nitric oxide, the feed stream may contain inert gases such as the rare gases, e.g., argon; nitrogen; water vapor; and carbon dioxide. The nitric oxide used may be in the form of ammonia oxidation product gas consisting principally of nitrogen in addition to the nitric oxide. The presence of saturated hydrocarbons, e.g., propane, is not deleterious in the present process.

For simplicity, the process of the invention has been described in detail with respect to the reaction of propylene and nitric oxide to produce acrylonitrile. However, the process also is applicable to other olefinic hydrocarbons and to compounds containing the alkyl-substituted C=C linkage as part of a carbocyclic or heterocyclic ring. For example, toluene yields benzonitrile, the xylenes a mixture of the corresponding mono- and dinitriles, and β-picoline gives nicotinonitrile. Many other modifications and variations within the scope of the invention will be apparent to those skilled in the art. Accordingly, we intend to be limited only by the following claims.

We claim:

1. In the process for the preparation of acrylonitrile which comprises catalytically reacting nitric oxide with propylene, the improvement of effecting said reaction at a temperature of about from 250 to 700° C. in the presence of a catalyst containing about from 0.5 to 90% by weight of thallium ion.

2. A process of claim 1 wherein said catalyst contains about from 0.5 to 30% by weight of thallium ion, Group VIII metal ion and an inorganic support containing at least about 50% by weight of at least one member of the group consisting of oxides of aluminum, silicon, magnesium, and iron.

3. A process of claim 2 wherein said catalyst contains about from 0.5 to 30% by weight of thallium ion and about from 0.5 to 35% by weight of iron ion.

4. A process of claim 3 wherein said catalyst contains about from 1 to 20% by weight of thallium ion and about from 0.5 to 35% by weight of iron ion deposited on a support containing at least about 50% by weight of α-alumina.

5. A process of claim 3 wherein said catalyst contains said thallium ion, said iron ion, and additionally, about from 0.001 to 2% by weight of platinum ion.

6. A process of claim 3 wherein said catalyst contains said thallium ion, said iron ion, and additionally, about from 0.001 to 2% by weight of palladium ion.

7. A process of claim 3 wherein said catalyst contains said thallium ion, said iron ion, and additionally, about from 0.5 to 35% by weight of nickel ion.

8. The process of claim 1 wherein said catalyst contains about from 0.5 to 30% by weight of thallium ion, about from 0.01 to 20% by weight of lead ion and an inorganic oxide support containing at least about 50% by weight of at least one of the group consisting of oxides of aluminum, silicon, magnesium and iron.

9. A process of claim 8 wherein said catalyst contains said thallium ion, said lead ion and about from 0.01 to 10% by weight of boron ion.

References Cited in the file of this patent

UNITED STATES PATENTS

| | | |
|---|---|---|
| 2,419,186 | Harris et al. | Apr. 15, 1947 |
| 2,476,771 | Salzberg | July 19, 1949 |
| 2,707,706 | Bauch | May 12, 1955 |
| 2,736,739 | England et al. | Feb. 28, 1956 |
| 2,781,325 | Rottig | Feb. 12, 1957 |

OTHER REFERENCES

Berkman et al.: "Catalysis," 1940, page 413.
Bergmann: "Acetylene Chemistry," 1948, page 80.